Bernard J. Buell
Robert L. Moore,
INVENTORS.

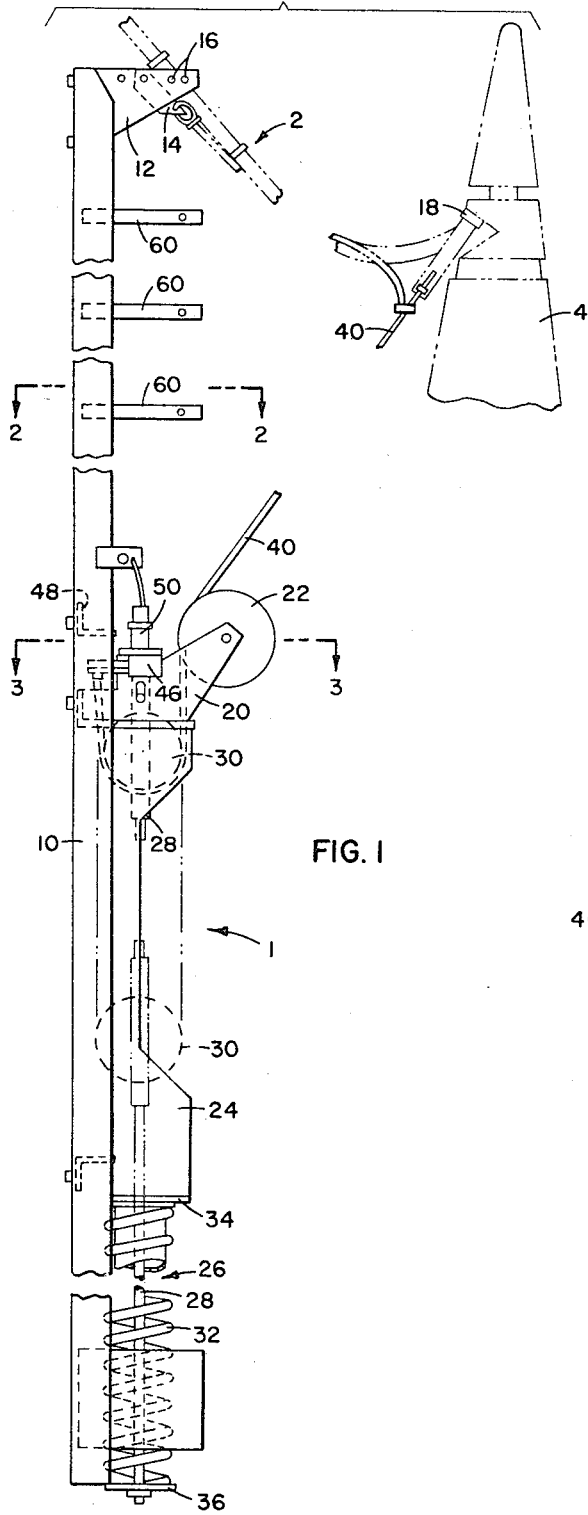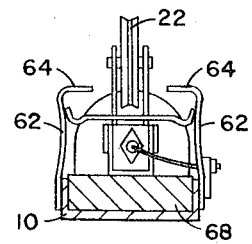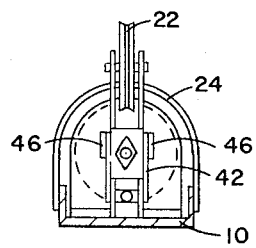

May 20, 1969  B. J. BUELL ET AL  3,444,779

LANYARD RETRACT APPARATUS FOR AN UMBILICAL CABLE ASSEMBLY

Filed Feb. 14, 1968

Bernard J. Buell
Robert L. Moore,
INVENTORS.

United States Patent Office 3,444,779
Patented May 20, 1969

3,444,779
LANYARD RETRACT APPARATUS FOR AN UMBILICAL CABLE ASSEMBLY
Bernard J. Buell and Robert L. Moore, Orlando, Fla., assignors, by mesne assignments, to the United States of America as represented by the Secretary of the Army
Filed Feb. 14, 1968, Ser. No. 705,535
Int. Cl. F41f 3/04
U.S. Cl. 89—1.811                    6 Claims

ABSTRACT OF THE DISCLOSURE

The apparatus includes a vertically disposed support frame pivotally supporting at its upper end a portion of an umbilical cable assembly, a fixed pulley mounted for rotation on the frame below the upper end thereof, a movable pulley mounted on the upper end of a reciprocable rod for vertical movement within said frame, an inertially damped shock absorber, and a retractor mechanism for retracting the umbilical cable assembly from connection with a missile or the like vehicle. A lanyard, connected at one end to the umbilical cable assembly, engages the two pulleys intermediate the ends thereof, and has its opposite end connected with the shock absorber. The shock absorber, including a counterbalance arm using lead weights and an overcenter mounting, anchors the lanyard to the frame, allows for limited relative movement between the frame and the umbilical cable assembly, and maintains a predetermined tension on the lanyard prior to actuation.

Background of the invention

The invention relates to a lanyard retract apparatus and shock absorbing arrangement for an umbilical cable assembly connecting the ground support networks to a missile.

Prior art arrangements have relied primarily on the use of a single spring connected between the free end of the lanyard and fixed ground structure. Such prior arrangements have not provided for static pretensioning of the lanyard and, too often, have failed because of relative displacements during ground shock, prior to actuation.

Summary of the invention

An umbilical retract apparatus having a shock absorbing and pretensioning device is provided, this device being operably connected between the lanyard and the retract apparatus. The device includes a pivoted weight which provides a predetermined amount of pretension on the wire rope lanyard and, additionally, allows a predetermined degree of relative movement between the missile and the cell wall of the silo or the fixed structure on which the retract apparatus is supported. The arrangement provides sufficient inertia at the start of retraction to move the pivoted fulcrum mass and umbilical connector without taking up the allowance for ground shock and, additionally, provides for damping shock loads introduced into the wire rope or lanyard. A caternary hang of the umbilical cable and a low pretension in the lanyard produces a minimum pull on the missile from ground shock movements.

Brief description of the drawings

FIGURE 1 is an elevation view of the umbilical retract apparatus according to the present invention;
FIGURE 2 is a sectional view taken on lines 2—2 of FIGURE 1;
FIGURE 3 is a sectional view taken on lines 3—3 of FIGURE 1.

Description of the Preferred Embodiment

Figure 4:
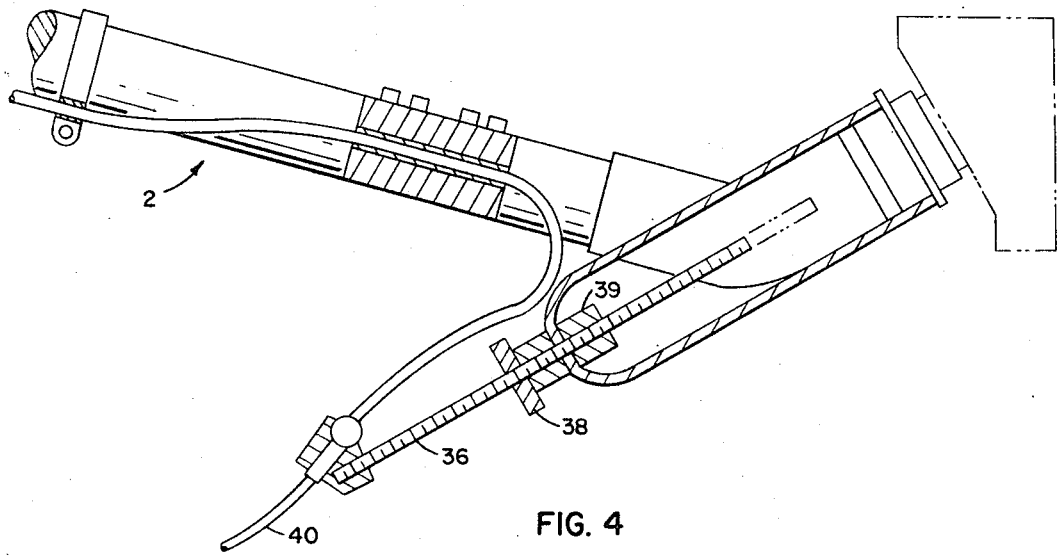
FIGURE 4 is an enlarged view of a portion of the umbilical cable assembly illustrating the connection of the lanyard thereto.

Referring to the drawings, FIGURE 1 shows the umbilical retract apparatus 1 of this invention. This apparatus is used to rapidly retract an umbilical cable assembly 2 from its connection with the electrical control circuits of a missile 4 (partially shown), to absorb the energy of retraction, and to retain the assembly clear of the missile after retraction and during launch ejection. The apparatus includes a support frame 10, which may be an aluminum channel, mounted in a vertical position against the cell wall (not shown) of a missile silo (not shown). A cable support bracket 14 is pivotally mounted on flange 12 at the upper end of the frame. This bracket functions to pivotally support the umbilical cable assembly at a position intermediate the ground control equipment and the umbilical connector 18 at the missile. A plurality of support positions 16 are provided in the flange so that the pivoting bracket may be adjusted for missile to cell tolerances. As depicted in FIGURE 1, the cable assembly is clamped to the bracket at a length which allows a caternary hang between the cell wall (not shown) or the support frame and the umbilical connector 18 connected to the missile. A support member 20 extends laterally from the frame and supports a fixed pulley 22. It is noted that this support member is located at a predetermined distance from the upper end of the frame such that the cable assembly, when retracted, may hang downward between cable support bracket 12 and fixed pulley 22. A tubular frame member 24 is secured to the support frame below support member 20. Frame member 24 serves as a support and guide for the umbilical retract mechanism, generally designated by reference numeral 26. The umbilical retract mechanism, includes an elongated rod 28 having a movable pulley 30 supported on its upper end and a coiled compression spring 32 mounted concentrically about the rod between an abutment flange 34 on the bottom of frame member 24 and stop washer 36 on the lower end of the rod. While the compressed spring actuator is preferred, a conventional gas-driven piston actuator may be used.

A wire rope type lanyard 40 at one end connects the retract mechanism with the umbilical cable assembly as by an adjustable stud 36 and nuts 38 and 39 (FIGURE 4). This adjustment feature provides for initial adjustment during installation and also allows correction for ground settlement tolerances. The lanyard passes over guide pulleys 22 and 30, and its opposite end is connected to one end of rocker arm 42 of a counterbalance type shock absorbing and pretensioning assembly. Rocker arm 42 is pivotally mounted as at 44 (FIG. 5) on support bracket member 20 in an overcenter manner. The opposite, long end of rocker arm 42 carries a pair of weights 46. As depicted in phantom in FIG. 5, arm 42 is allowed to swing or pivotally move through an angle of about 80–90° as limited by stop 48 on the frame. The counterbalance assembly, using the weights and the overcenter rocker arm mounting, anchors the lanyard to the retractor frame while allowing for missile to cell wall movement caused primarily by ground shock and cell settlement. Further, this latter assembly is utilized to maintain a predetermined tension on the lanyard and to reduce shock load when the lanyard slack is taken up on release of the compressed spring. To maintain the movable pulley in its normal position, i.e., with the spring compressed and with the rocker arm in horizontal disposition, a squib-actuated latch device 50 is provided.

Figure 6:
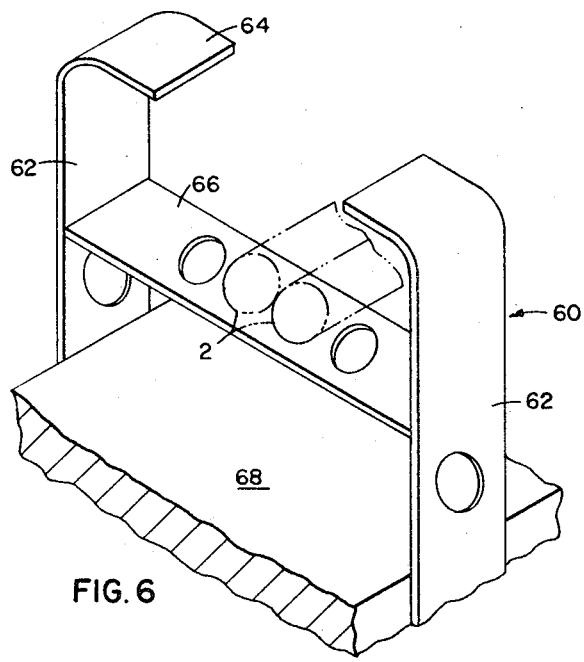
FIGURE 6 is a view of one of the energy-absorbing, cable retaining brackets.

In order to absorb shock, retain the umbilical cable assembly, and prevent the same from rebounding into the missile launch envelope, a plurality of energy-absorbing cable retaining elements 60 (FIGURES 6 and 7) are provided in spaced relation along the support frame. Each of these elements includes a pair of parallel legs 62 with return-bent terminal portions 64 and a cross-member 66. The space between terminal portions 64 defines an opening of such width as to receive the umbilical cable assembly therebetween in a manner as will be described hereinafter. A rigid urethane foam pad 68 is secured within the channel frame member between the legs to limit the travel of the umbilical cable and to function as additional shock absorbing means. The foam pad serves to prevent shattering of the umbilical connectors and limits the retaining action of the parallel legs.

*Operation of the preferred embodiment of the invention*

Figure 5:
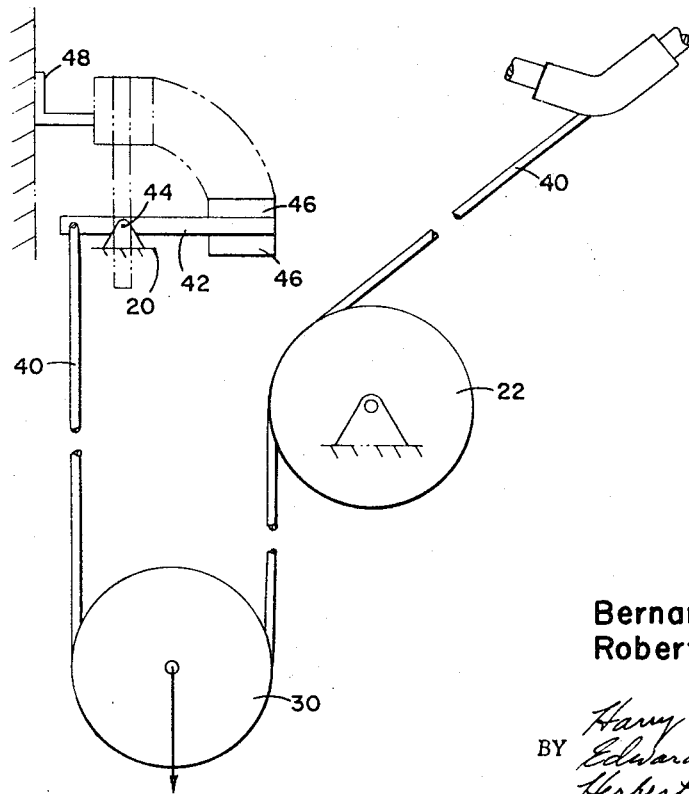
FIGURE 5 is a diagrammatic view illustrating the operation of the shock absorbing and pretensioning means.
Figure 7:
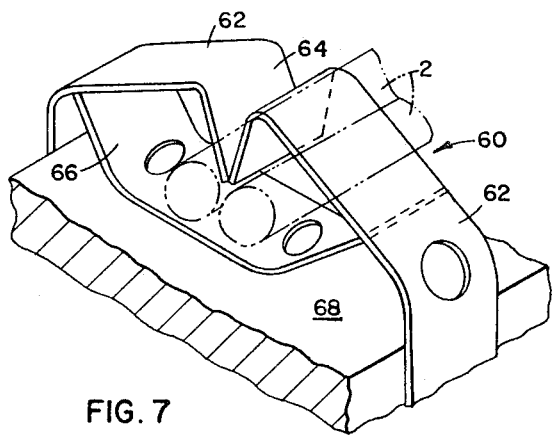
FIGURE 7 is a view similar to FIGURE 6 but depicting the bracket in a clamped position after impact of the umbilical cable therewith.

Prior to actuation, pulley 30 is held in fixed position by squib-actuated latch 50, spring 32 is compressed, and the counterbalance arm is in a horizontal position as illustrated in FIGURE 5. It should be apparent that impact stop angle 48 prevents the weighted end of the arm from moving over center during ground shock, thereby always assuring its return to horizontal. Actuation is effected upon receipt of the retract signal by the squib-actuated latch wherein pulley 30 is released and forced downwardly by the energy of the compressed spring. The weights on the counterbalance arm provide rotational inertia to the extent that both the weights and the connector begin to move together initially without rotating pulley 30. As the weights move through approximately 80 degrees of rotation, the lanyard connection passes from maximum acceleration to zero, and, in turn, the velocity of the connector is caused to transition from the velocity of pulley 30 to twice that velocity. The end of the counter-balance arm having the weights or added mass impacts angle bracket 48 to stop its rotation without inducing a reaction load into the retract lanyard or associated structure. As will be apparent from the drawings, FIGS. 6 and 7, the retainer brackets function to absorb energy of the moving retracted cable assembly while closing on the cable to retain the same clear of the missile. These retainer brackets respond to the impact energy of the umbilical cable assembly wherein the cross-members are deformed on impact and driven toward the frame so that the terminal portions of the pair of side legs are forced into a pocking position over the cables as depicted in FIGURE 7.

In summary, it is seen that the dual pulley retract system incorporating the counterbalance assembly has many advantages over prior structure. Thus, by pretensioning the lanyard, the retract lanyard whip and the resulting lanyard loading during retraction is minimized. Secondly, relative movements between missile and cell wall are allowed during ground shock environment. Thirdly, the inertial resistance to movement is high enough to initiate connector movement without having to wait for play-out of the movement allowed for ground shock. The latter feature is critical to meeting a desired requirement for electrical pin separation within 10 milliseconds after receipt of the retract signal. Additionally, dampening is provided during the initial take-up of slack and during the acceleration of the umbilical connectors. Moreover, the dual pulley lanyard system provides, for example, a two inch reel in for each inch of actuator stroke. This minimizing of stroke also minimizes structural length, linkage, actuator stroke. This minimizing of stroke also minimizes structural length, linkage, actuator weight, and subsequent cost.

It is, therefore, to be understood that the invention comprehends various obvious changes in the embodiment herein illustrated, within the scope of the appended claims.

1. Apparatus for retracting an umbilical cable assembly from attachment with a missile and for retaining said assembly clear of the missile after retraction, the combination including: a vertically disposed rigid frame having a horizontally extending flange on its upper end; an umbilical cable assembly having an umbilical connector on one end thereof connected with the umbilical of the missile and being supported at a predetermined distance short of said end by a cable support bracket, said bracket being pivotally mounted on said flange; a support member extending laterally from said frame at a location spaced vertically below said flange; shock absorbing and pretensioning means carried by said support member; a lanyard connected at one end to the umbilical assembly adjacent the umbilical connector and at its opposite end operatively connected with said means; guide means disposed intermediate the ends of said lanyard for guiding the lanyard and umbilical assembly during retraction; and retractor means supported by the lower end of said frame for effecting rapid retraction of said umbilical assembly.

2. Apparatus as recited in claim 1 wherein said shock absorbing means includes a plurality of energy-absorbing, cable retaining brackets fixed in vertically spaced relation on said frame intermediate the upper end thereof and said support member, each said retaining bracket being defined by a pair of spaced apart legs extending from the frame in normal relation therewith and a deformable cross-member connecting the pair of legs intermediate the ends thereof, whereby upon retraction of the cable assembly, the assembly will pass between the legs and engage the cross-member deforming the same against the support frame and causing the legs to fold inwardly toward each other thereby clamping the cable therein.

3. Apparatus as recited in claim 1 wherein said guide means is defined by a fixed pulley carried by said support member and a movable pulley, said apparatus further including a vertically disposed rod carrying the movable pulley on its upper end and being operatively connected with the retractor at its opposite end, said movable pulley being in engagement with said lanyard so that, upon actuation of said retractor means, the movable pulley moves vertically downward in a plane parallel with the support frame thereby pulling the lanyard away from its connection with the missile.

4. Apparatus as recited in claim 3 wherein said retractor means includes a compression spring disposed concentrically about said rod.

5. Apparatus as recited in claim 4 wherein said shock absorbing means includes an elongated arm pivotally mounted on said support member in an overcenter manner, a mass comprised of a pair of weights carried by the long end of said arm and the lanyard being connected to the short end of said arm, a stop carried by said frame in a location such that, when said arm is pivotally rotated from its normal horizontal disposition to a generally vertical position, the weighted end of said arm will engage said stop.

6. Apparatus as recited in claim 5 wherein explosively-actuated latch means is carried by said support member, said latch means normally holding the movable pulley in position against the bias of the compression spring but releasing the same upon actuation of the retractor means.

References Cited

UNITED STATES PATENTS

| | | | |
|---|---|---|---|
| 3,119,645 | 1/1964 | Abbott et al. | 339—45 |
| 3,224,335 | 12/1963 | Witherspoon et al. | 89—1.811 |

SAMUEL W. ENGLE, *Primary Examiner.*